Sept. 12, 1950     O. M. ARNOLD     2,522,082
METHOD OF BONDING
Filed Feb. 3, 1945
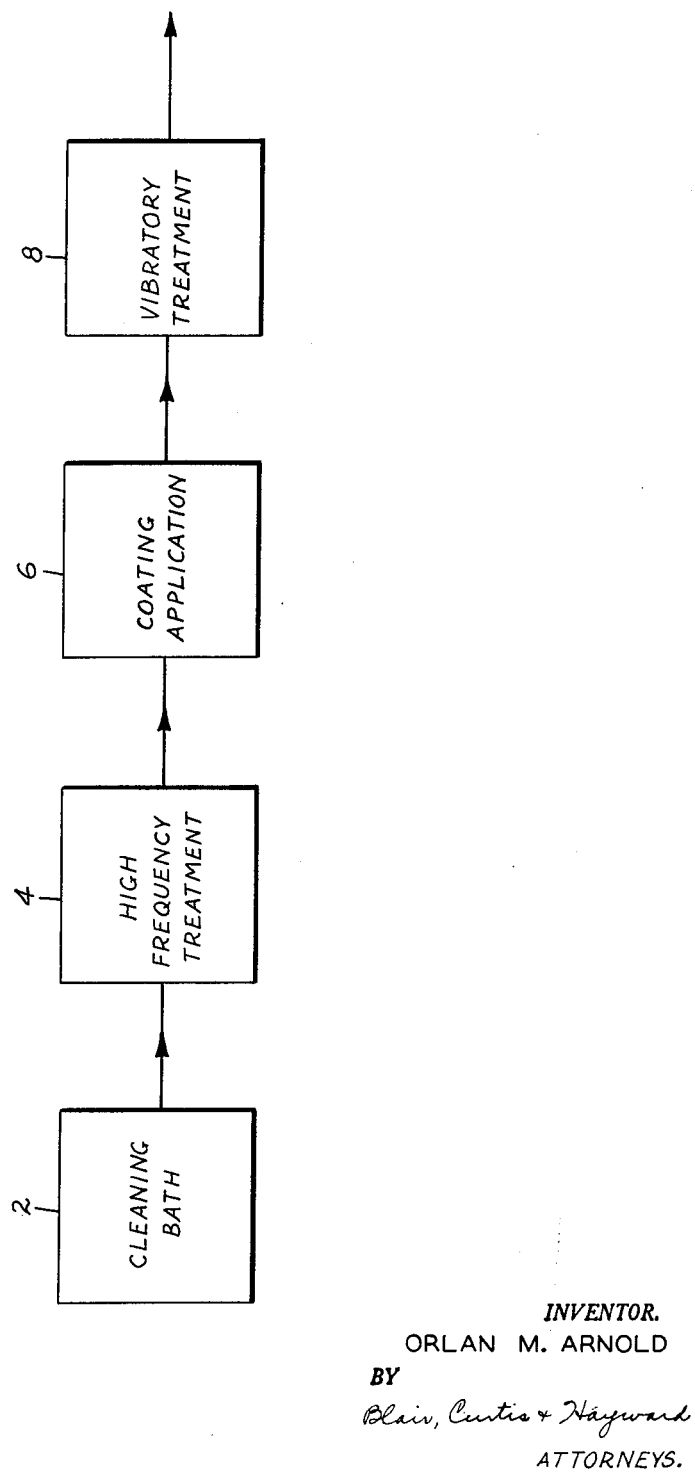
INVENTOR.
ORLAN M. ARNOLD
BY
*Blair, Curtis & Hayward*
ATTORNEYS.

Patented Sept. 12, 1950

2,522,082

UNITED STATES PATENT OFFICE 2,522,082

METHOD OF BONDING

Orlan M. Arnold, Grosse Pointe Park, Mich.

Application February 3, 1945, Serial No. 576,151

14 Claims. (Cl. 18—48)

This invention relates to cleaning the surfaces of solids and especially to bonding procedures, particularly to the application of coatings, the uniting of pieces (including particles and sheets) of material and to the products of such procedures, and to conditioning of solids for surface reactions. In one aspect this application relates to a specific invention within the scope of my invention described and claimed in my copending application Serial No. 576,245, filed February 5, 1945. In another aspect it relates to an invention within the scope of my invention described and claimed in the copending application Serial No. 504,902, filed October 4, 1943 now abandoned. Whereas in my said application Serial No. 576,245 I have disclosed the evaporation of particular substances and/or substances from particular positions by selective activation of molecules with vibratory influences of particular frequency or combinations of frequencies; and in application Serial No. 501,707, filed September 9, 1943, I have disclosed the bonding of surfaces by selective activation of molecules of a softenable substance in said surface and the diffusion of substances by selective activation of the molecules concerned in the diffusion; and in the application Serial No. 504,902 I have disclosed the inducing or stimulation of desired chemical reactions by selective activation of reacting molecules; in this application I am concerned with the effective application and adhesion of surfacing materials to which end I use one, some, or all of the inventions of my said other applications in a new combination.

Complete effectiveness in coating procedures and in other bonding methods has always been difficult to obtain. One major problem which presents itself is the provision of a bonding surface which is as free as possible of foreign substances. Ordinary dirt, oil, etc., may be removed by washing with detergents and solvents; oxides and various corrosion products can be removed by abrasion and/or pickling or other chemical or electrolytic cleaning; but all of these treatments tend to leave certain substances adsorbed by the surface especially moisture, other solvents, air and other gases, etc. This problem presents itself with painting, with plating, with welding, with powder molding among others and especially where one or both of the materials thus united are metals. In some cases, moreover, effective coating depends upon bringing about chemical reaction or a molecular association of an applied substance with a surface material. In such cases, and in other cases where chemical effects are sought on solid surfaces, the production of a chemically clean surface is of great importance.

By means of the present invention the foregoing and other difficulties are readily and effectively overcome. In accordance with the invention utilization is made of special frequencies known as the "anomalous dispersion range," and especially of frequencies near the center of the anomalous dispersion range, for the substance or substances concerned and in the environmental conditions of the treatment. Such frequency may be imposed with particular advantage by an electrostatic field, or with somewhat less advantage by other electric (including magnetic) field and even by ultrasonic, the field being intermittent or alternating with the particular frequency. These I shall refer to generally in this application as the "vibratory influence."

The invention accordingly contemplates the application of an electrostatic or other vibratory influence of particular predetermined frequency or frequencies to act selectively on a substance or substances which, until removed from a surface impair its usefulness for the intended purpose. In addition to this, an applied material or the material of the body below its surfaces may be acted upon selectively by a particular frequency to facilitate diffusion away from said surface of adsorbed substances released by the treatment or to soften the surface, with or without softening other material in the vicinity. The molecules of a material at the surface thereof may thus be selectively activated without abnormally activating those in the interior of the material; and such activation at once aids in driving off foreign substances and in rendering more adhesive the immediate surface layer for bonding. Foreign substances on a surface, for example as a surface to be coated, may be so activated by such selective frequency as to cause them to escape the forces by which they are normally held to said surface, or to so loosen them as to be readily removed by other means. Such activation of the molecules of foreign substances, moreover, imparts energy to the surface from which they are removed, thus leaving it in condition for effective bonding, chemical action, etc. Continued exposure to such a vibratory influence causes a general heating of the material, as is already well understood in the art. I may utilize such heating or I may use the selective activation of a particular material or materials, or a particularly located material or materials in accordance with my invention disclosed and claimed in prior copending applications Serial Nos. 501,707 and 504,902. The present invention is concerned with the removal from the bonding surface of substances which if left would tend to weaken or deteriorate the bond, or interfere with other desired action, physical or chemical, at such surface. In view of what has been said it will be appreciated that the invention is especially concerned with the release, by such vibratory influence, of materials which when released can escape from the surface by diffusion into or through the surrounding medium. I shall use the term "diffusible" to designate such substances.

An advantage of this procedure is that destructive heating is not required, and thus materials can be treated by my invention which would be seriously deteriorated or destroyed by any general heating which could be effective for the same purposes. Moreover, the advantage of the selective action with avoidance of incidental heating is evident in instances where the materials to be bonded or associated materials are to be handled manually immediately after treatment. Ingredients of a coating substance or other bonding material may be polymerized or otherwise reacted in situ, simultaneously or subsequently by the same or a similar vibratory influence in accordance with my invention disclosed and claimed in the copending application Serial No. 504,902.

The term "range of anomalous dispersion" is used in its accepted sense, i. e., that range of frequencies in which the dielectric constant varies in value with change of frequency. Each such range of anomalous dispersion is due to a particular material which at the center of the range reaches a maximum molecular activity induced by the applied frequency. This frequency of maximum activity at the center of the range of anomalous dispersion may be called the "critical frequency" for the particular substance under its given environment. Similarly, in the case of intermittent direct-current frequency, the anomalous dispersion range is the range in which the molecular activity, induced by intermittent orientation periods and subsequent relaxation times, will be abnormally great.

This anomalous dispersion range and critical frequency are locatable by plotting a curve with frequency as the horizontal abscissa and the dielectric constant of the material as the vertical ordinate. For the most part the resulting plot will be a horizontal line, or lines, but each anomalous dispersion range will give an S-curve not unlike the characteristic curve of a radio tube. With a material under influence of alternating voltage, intermittent voltage, sonic, ultrasonic, or other vibratory influence plotted from dielectric constant values for the conditions of operation will show a change when the range (or a range) of anomalous dispersion is reached and a leveling off when the frequency leaves this range. Practically, "spot checks" are made at widely spaced frequencies to show in what general regions of frequencies such changes occur. Then further tests are made more closely spaced in the frequency range or ranges thus selected, until the anomalous dispersion range is located. In practice, it is not necessary to locate more than a few points in the anomalous dispersion range, because of the characteristic form of the S-curve. An experienced operator given the spot check points and a few points on each S-curve can accurately draw in the balance of the curve.

In certain molecules there is more than one range of anomalous dispersion; for example, a lowest frequency range may be due to movements of the entire molecule and a higher range may be due to the restricted movement of a portion of the molecule. In such case I find it most advantageous for present purposes to use that range of anomalous dispersion which is effective for the entire molecule, although others can also be used in the practice of the invention if conditions are maintained to avoid objectionable chemical reactions which may be stimulated by such activation of portions of the molecule, or if such reactions are not objectionable.

It has been shown and heretofore published, by others as well as by myself, that the effect of alternating or intermittent electrostatic fields upon any given molecule or group of molecules, depends upon the frequency (including component frequency of a complex wave), on the inherent nature of the molecule, portion or group concerned, and upon the ambient conditions in which it is exposed to the given frequency or frequencies. This can be best understood by considering a molecule of considerable length having opposite charges spaced apart along its length so as to form a dipole. If this is subjected to an alternating electrostatic field, there will obviously be an influence tending to pull the negative charge toward the positive pole and the positive charge toward the negative pole and thus to align the dipole in the electrostatic field. When the polarity of the field is reversed the influence acting on the dipole tends to turn the molecule end for end and align it oppositely in the field. If the alternations are sufficiently slow, and if we assume the molecule to exist in a vacuum, it would thus follow perfectly the alternations of the field turning end for end each time the field reverses its polarity. Practically, however, a molecule will normally be found in the presence of other molecules with which it may collide in its efforts to turn end for end or which, even in the absence of collision, may exert attractive forces tending to disorient the molecule with respect to the field. Given sufficient time during each polarity of the field and a sufficient field strength, a given molecule may find its way through the various obstructive forces and align itself fully with the field; but to the extent that it is pulled by the force of the field against the opposing forces of the obstructing molecules, work is done and energy absorbed.

If the frequency is increased, the first effect is to increase the rate at which this process proceeds and thus to increase the power absorbed; with continued increase of frequency, however, there soon comes a time when the molecule cannot be pulled into alignment during the half-cycle period of continued polarity of the field, so that orientation lags behind the changes of field. Thus molecular activity passes through a maximum and begins to decline.

If the concentration or nature of other molecules around the molecule in question is changed, obviously the obstructing forces will likewise be changed and, therefore, the critical frequencies will be changed. If the voltage of the field is made higher or lower it will exert a greater or lesser pull on the molecule in question and thereby will be able to orient it, or to cause substantial orienting movement, within a shorter period of time; and thus again the critical frequency will be changed. Likewise, if the temperature is changed, the thermal agitation of the molecule in question and of the surrounding molecules will be increased or lessened so that there will be more or fewer impacts tending to disorient the molecules in the field. Thus, again the critical frequency would be changed. Molecules in crystals are normally oriented in the crystal lattices by inherent forces, such forces also must be overcome to the extent that the molecules are oriented to the alternating field.

Thus the anomalous dispersion range for any given material will occur at different frequencies depending upon the molecular environment and especially upon voltage, temperature, presence of other molecules and the spatial relation and orientation of the various molecules concerned.

Other vibratory influences affecting molecules of a substance, particularly induced eddy currents, alternating or intermittent ionic currents, hysteresis effects in magnetic materials and supersonic vibrations also produce similar anomalous changes in dielectric constant; these when used in the anomalous dispersion range are within the broader aspect of this invention, although there is advantage in the use of the alternating electrostatic field for most purposes. In its broader aspects the invention contemplates carrying out of a surface cleaning, and particularly as a part of a surface action, e. g., chemical reaction or a bonding procedure, by the application of a vibratory influence of predetermined frequency or frequencies which will selectively agitate molecules of a particular substance which is to be removed from the surface and in their particular environment on such surface without limitation as to the cause of said vibratory influence.

Any increases of temperature, application of additional material, chemical changes and/or changes in concentration, e. g., by diffusion or evaporation, which occur during the process may tend to move the anomalous dispersion range away from the frequency at which it first occurred. According to my invention the frequency may be controlled to follow such migration of the anomalous dispersion range or may be chosen at the anomalous dispersion frequency of the material after it has thus migrated. In this latter case, the frequency at first acts generally to heat the material and only becomes selective as the changing conditions bring the anomalous dispersion range of the particular material to the applied frequency.

Alternatively the conditions under which the treatment occurs can be controlled so as to avoid or counteract those changes which cause migration of the anomalous dispersion range. Temperature change by incidental heating can, for example, be avoided by cooling.

Alternatively, and with important advantages, I can employ a multiple or complex frequency as where one frequency component of the electrostatic field acts under the conditions of the initial treatment and another component of the field acts under the changed temperature, density, and/or other conditions which vary as the action proceeds.

I may also provide varying environmental conditions which will counteract changes which normally occur and thus keep the anomalous dispersion range at the given frequency; thus cooling, pressure, and/or voltage may be adjusted so that the anomalous dispersion range for the given substance continues, throughout the operation, to include the frequency applied, thus compensating for the inevitable changes which occur as the operation proceeds.

In working with very high frequencies, there is a strong tendency to ionization of air between the electrodes; it is best to design the electrodes to minimize this and to use insulation if necessary or other means to avoid so far as possible electrical discharges. For this reason, the voltage gradient which may be used with given electrodes at a given pressure is limited. If it is desired to use higher voltage, such discharges can be prevented by use of higher pressure atmospheres above the pressures at which discharges would begin to occur with the given voltage, or by immersion in a bath, e. g., an insulating hydrocarbon oil, or advantageously by interposing solid insulating layers between, and advantageously covering the electrodes.

I have found it suitable to use as refractory insulator for this purpose Isolantite, beryllia, mica, mica substitutes, or other insulators resistant to the effects of temperature and high frequency. Such insulator may be fitted over the electrode, or may be used as a plate or plates interposed between the electrodes in the area of treatment. This expedient has in many cases the additional advantage of reducing the transfer of heat from the material being treated to the electrodes, which are ordinarily good thermal conductors and therefore tend to withdraw heat from the treating zone. However, in cases where the treatment is to take place at atmospheric temperature, or below, it may be an advantage to cool the electrodes and expose them directly to the material without such interposed insulation.

In the case of hydrocarbons and other compounds which are ordinarily regarded as non-polar or only weakly polar, the use of a high voltage gradient may be necessary in order so far to distort the molecule as to give it a polar character; or, due to the high field strength, even a slight separation of charges in (or displacement of parts of) the molecule or atom may be sufficient to cause it to orient in the field.

The determination of the range of anomalous dispersion for any given substance in any given environment is not my present invention, and is already well understood in the art. This may be accomplished by any available method, for example, a set forth in the paper of Gross, Ott and Arnold, Transactions of the Electro Chemical Society, vol. 74 (1938), pp. 193-210, or as set forth in the various of the papers cited in the article by Fuoss in the "Chemistry of Large Molecules." For ordinarily non-polar substances such as styrene polymers the determination may be by the heterodyne beat method or the resonance method described, for example, by Smyth, "Dielectric Constant and Molecular Structure" (A. C. S. Monograph No. 55), pp. 53 et seq., and Hartshorn, "High Frequency Measurements."

As a general procedure, one should first locate generally the anomalous dispersion range for the particular material and for the particular conditions of treatment, such especially as voltage, nature and geometry of electrodes, geometrical relation of molecules, i. e., orientation spacing, space patterns, etc., temperature, impurities, presence of solvent, diluent, etc., and their concentration, and mixture with other substances. This can be done, for example, by determining the dielectric constant at low frequency, e. g., from a few cycles to 1000 cycles per second, then determining the optical index of refraction (the square of this will be the limiting value for the dielectric constant), and then determining the dielectric constant at different frequencies spotted at points throughout the electrical spectrum (i. e. at various frequences). Wherever a substantial difference appears between the dielectric constant for the material at one frequency and the dielectric constant at the next frequency chosen (the other conditions being kept the same), at least a part of a range of anomalous dispersion lies between the frequencies used in these two tests. By making additional tests more closely spaced within this area of the electrical spectrum and with adjacent frequencies beyond the area and plotting the results, the typical S curve will result which will locate accurately the central frequencies of the anomalous dispersion range. It is important to make enough such determinations to plot the curve since the initial "spot" tests may include more than one anomalous dispersion range between them. When a test shows a dielectric constant equal to the square of the index of optical refraction, this indicates that no further anomalous dispersion zone will occur at higher frequencies at the given voltage. At higher voltages, however, there may be distortions of the molecules which cause anomalous dispersion which does not appear at lower voltage.

Known theory or experience may be drawn upon to indicate the likely ranges for the anomalous dispersion with various materials; but until considerable experience has been had with a given material it is better not to rely entirely upon these since the particular frequences required will depend to a substantial extent upon environmental conditions.

The particular anomalous dispersion range which is to be utilized can be roughly selected by the general principles outlined above, and by bearing in mind that for longer and heavier molecules, lower frequency ranges are required to activate the molecule as a whole. For small light molecules, such as water, ultra high frequencies, e. g. in the range of $10^4$ to $10^{10}$ cycles per second, are usually required; whereas long polymeric molecules are activated as a whole at frequencies of $10^2$ or less. There is evidence that some materials have critical frequencies close to one cycle per second or lower. The more viscous the medium in which the molecule occurs, the lower the frequency of the anomalous dispersion range and the higher the energy adsorption in the anomalous dispersion range. Molecules at the surface, being few as compared with those in the interior, will give relatively small change in over-all dielectric constant and relatively small energy absorption due to their resulting molecular agitation; and, because of surface tension phenomena the anomalous dispersion range for a given substance at the surface will be at higher frequency than for the same substance within a body of material but otherwise under substantially the same conditions. As in other branches of spectrometry a known material having known anomalous dispersion ranges may be added, e. g. by superimposing a layer of the known substance on the layer of test material, and when the anomalous dispersion spectra before and after such addition are compared the changes are readily attributable to the known substance or substances and serve as reference to identify others in the spectrum of the sample. Alternatively, after an analysis by other methods, additional amounts of each substance may be added so that its molecules are intermingled with molecules of the same substance already present in the orginal material. Each such addition will shift the various anomalous dispersion ranges slightly because of the changed environment, but primarily it will exaggerate the S-curve or curves for that particular substance so that the particular frequency for selective action on that substance can be identified and selected.

Where it is desired to act selectively on materials at the surface, the materials thus present can be first identified by usual methods, e. g., micro-chemical analysis or by spark-spectrum analysis, etc. A small amount of each material which is to be selectively activated can then be added to the surface for each of separate tests and the anomalous dispersion spectra before and after such addition compared as described above. Such additions can be applied by exposing the sample briefly to a vapor of the substance, by leaving the surface for a substantial period in contact with a surface of the substance to be added, with application of heat or electricity if that is not otherwise objectionable under the circumstances, or even by dusting with the substance in finely powdered form, or dipping, painting, spraying, etc., with a fused or liquid material and then removing as much as possible of the applied substance without removing the surface material of the sample being tested. The added substance can also be applied in solution by dipping, painting, spraying, etc., but it must be remembered that every ingredient of the solution, including the solvent, will be present on the surface to affect subsequent tests unless special precautions are taken for their removal.

It will often be found with materials of a complex or polymeric structure, that the same substance may have several anomalous dispersion ranges at different parts of the electrical spectrum. In such case, it is advantageous for purposes of this invention to select the lower or lowest frequency range, which causes agitation of entire molecules.

Although the selective activation of molecules is characteristic of the entire anomalous dispersion range, it rises to a maximum at the center of the range, where the slope of the S-curve is at a maximum. It is, therefore, desirable to adjust the frequency of treatment as near to this center as is practicable, taking into consideration its shift during operation as discussed above.

Among the numerous and various organic resinous materials, for example, alkyd resins, hydrocarbon polymers, e. g., polystyrene, polyamides, etc., including many materials regarded as "difficult" to bond, can be very successfully bonded to metals and other materials. With such coatings, in accordance with the invention, a variety of softening, polymerizing, or chemical reaction effects, may be selectively stimulated by molecular agitation or agitation of particular chemical groups in the affected substances. Such softening is in accordance with the method disclosed and claimed in my application Serial No. 501,707 and the polymerization or other chemical reaction is in accordance with my application Serial No. 504,902. These are combined in the present invention so that in a single or successive treatment using several frequencies selective respectively to the cleaning of the surface, the softening of the coating material, the evaporation of solvent (if any) and the polymerization of polymerizable materials (if any), a paint, a lacquer, or an enamel, etc., can be perfectly bonded, flowed to a perfect film and dried to a hard glossy condition. The steps involved in one example of the present invention are shown in the attached drawing. An article to be coated is cleaned in a cleaning bath 2. It is removed from the cleaning bath and subjected to high frequency treatment 4 with frequencies within an anomalous dispersion range or ranges, respectively, of the foreign substance or substances, including in this case, the diffusable solvent remaining from the cleaning bath, at the surface which is to be coated. Those particular molecules are, thereby, quickly removed and the panel is immediately coated, as at 6, with suitable material, e. g. an alkyd resin type coating material. The coated article is then treated with e. g. an electrical field, as at 8, the frequency of which is within an anomalous dispersion range of one of the components of the coating material under the conditions of treatment, to thereby harden and smooth the coating.

The invention is likewise useful in the cleaning of a metal surface on which an electrodeposit is to be applied or is being applied; and thus to assure a very perfect bonding of the electroplate to the base.

By means of the invention adsorbed and even chemically combined water, oxygen, and other impurities may be removed from the surface and diffused so far away from the surface by the selectively induced molecular activity that they will not be impounded or entrapped by the coating material in spots where they would limit or impair the adhesion or cause a tendency toward corrosion under the coating. Thus, one may avoid tendencies toward breakthrough or micro-fissures, which in turn allow further oxygen and/or water to permeate the coating and further corrosion. In most instances surface impurities should be removed at the same time as or just previously to the application of the coating because the rate of sorption or resorption is very rapid and may take place in a fraction of a minute. Where chemically associated water is present in the surface, its removal leaves molecules in an active or unstable condition which readily associate with certain types of coating molecules and thus give a chemical bonding if such a coating is present or applied immediately after driving off the water.

Excellent results have been obtained by the use of the invention in coating procedures involving the plasticization of alkyd resin monomers. For example, a metal article is first exposed between electrodes to a field of frequency or frequencies in the anomalous dispersion range or ranges of the impurities on the surface which are to be removed. The article is then passed immediately through a bath of an alkyd resin liquid monomer such, for example, as Beckasol then passed between a pair of electrostatic electrodes, one of which may be a conveying roller if desired. There is set up between electrodes an electrostatic field of a frequency or frequencies within the anomalous dispersion range for the monomer, and preferably a frequency near the center of the anomalous dispersion range for the active group at which the polymerization bonding occurs. The resinous polymer forms immediately and uniformly, and attaches itself to the metal firmly and uniformly.

During the initial cleaning by frequencies within the anomalous dispersion range of foreign substances thereon the surface may be subjected to vacuum or an atmosphere which is not readily absorbed by the clean surface. The monomer may be sprayed on or otherwise applied to the surface in the vacuum or in such atmosphere promptly after the removal frequencies are applied; or, if the atmosphere is, for example, the vapor of the monomer or if a solvent for the monomer, the surface may be so conditioned to receive the coating and so protected from atmospheric air and moisture that further coating can be delayed.

In another exemplification a solution such as an insulating varnish of the polystyrene type, for example, in an ester solvent is applied to a copper base which has been previously subjected to an electrostatic cleaning action such as described above, and sprayed with the solution just at or slightly before the termination of the cleaning action. The coated material is then passed between electrodes which set up a frequency or frequencies within the anomalous dispersion range of the solvent. In this action the wattage input is kept sufficiently low or other precaution taken so that the film will not be disrupted by boiling of the solvent. If the liquid applied is capable of diffusing the impurities driven off from the surface, then the coating may be applied before the surface is subjected to the frequency or frequencies of the anomalous dispersion range or ranges for the impurities, and during this treatment another frequency or frequencies may be simultaneously imposed within the anomalous dispersion ranges of the impurities when in the coating film, thus stimulating diffusion away from the surface being cleaned. When the coating itself is not such as would permit diffusion of the impurities, a solution may be used the solvent of which also dissolves said impurities. Incidental heating may in this case serve for evaporation of the solvent; or another frequency in its anomalous dispersion range may be applied when cleaning has been effected, whereby to drive off the solvent.

The coating material may also be applied in powder, sheet, or other solid form. It is especially advantageous to apply the material in powder or granular form. If the surface is then subjected to a frequency within an anomalous dispersion range of the impurities to be removed the incidental heating may serve to fuse the coating material so that it flows over the surface only after it has been cleaned and while it is still being subjected to the purging influence. The surface may advantageously be cleaned, electrostatically according to the present invention or by ordinary cleaning methods, or both, before the coating material is applied. As one example, a vinyl chloride vinyl acetate copolymer resin in powdered form may be dusted onto a washed surface while still damp from the washing, so that a uniform layer of the powdered material adheres and excess is blown away. The surface thus treated is then subjected to an electrostatic field of frequencies in the anomalous dispersion ranges of the principal substance in the surface and of the impurities in the surface. By this method the surface is quickly purged of the impurities and the resin which is in contact with the surface becomes softened and flows laterally over the surface. This flow is advantageously stimulated by adjusting the circuit at this stage to introduce a frequency within the anomalous dispersion range of the applied resin. Powdered ceramic materials such as glass may be similarly applied and fused in accordance with the present invention to form an enamel without firing, and thus can be applied to many materials which would fuse or char during ordinary methods of application. Such procedures are highly advantageous, since the coating may be applied without a vehicle. This is especially advantageous with electrical apparatus wherein the presence of residual solvent, as well as impurities as are commonly on the coated surface, may seriously affect the power factor and/or breakdown strength.

The very strong induced activity of the molecules of coating material avoids many common difficulties such, for example, as pinholes and fissures in the coating.

Sheets of metal and plastic may be effectively bonded in accordance with the invention by running them between metallic rollers serving as electrodes. The purging frequencies are effective in the bight of the rolls to drive off impurities from the sheet-surfaces, whereupon the surfaces are immediately pressed together. Other frequencies for softening polymerizing, condensing or otherwise reacting bonding substances may be used, as in the cases previously described such frequencies being applied together with the purging frequency as a complex or subsequently as a simple frequency.

Exceptional results can be obtained in certain instances by selecting frequencies for particular effects. For example, in bonding a sheet of substance as, for example, a thermoplastic resin to a body of material as, for example, a strip of steel, a frequency band may be selected which will agitate selectively the loosely held molecules at the surface of the sheet of thermoplastic and cause them to penetrate the metal rather than merely to adhere to the surface as would result from ordinary softening of the thermoplastic. Again the thermoplastic may be softened by a frequency which does not selectively agitate the molecules of the thermoplastic at all, but which does agitate the molecules at the surface on which the thermoplastic is applied sufficiently to soften the adjacent thermoplastic surface indirectly by molecular impacts or other influence in the nature of conduction or radiation. Thus the applied frequency by selectively agitating surface, or other particular, molecules can produce localized heating effects at the surface, or elsewhere.

The invention gives advantage when applied with any of a wide variety of coating procedures, including electrolytic deposition. For example, a piece of aluminum (to which water vapor and oxygen tenaciously adhere) may be subjected in a fused electrolyte plating bath to an alternating current of simple or complex frequency including a frequency within the anomalous dispersion range of the water on the surface of the metal and a frequency of higher voltage in the anomalous dispersion range of aluminum oxide at said surface. Plating may follow immediately by shifting from the alternating to a direct current; or may occur concurrently by imposing a D. C. potential onto the alternating current to give a D. C. of fluctuating voltage in which the polar molecules are alternately pulled into alignment and allowed to relax. The aluminum in this case may serve as its own electrode and a high frequency ionic current through the plating bath serves to effect the cleaning.

As another example, a steel article after preliminary cleaning may be exposed between electrodes to an alternating electrostatic field of frequency within the anomalous dispersion range of water and a frequency adapted to remove the surface oxide film, after which the steel is dipped into a molten bath of lead-tin alloy.

As still another example, a steel article, e. g. a car, may be connected to form one electrode of a high frequency circuit and another electrode passed thereover having an orifice through which powdered metallic or resinous coating material is blown against the steel surface. A complex frequency is simultaneously applied having frequency components adapted respectively to remove surface impurities and another component frequency or frequencies adapted to fuse the powder so that it flows out on said surface, making a continuous protective film.

Since oxygen is far more active in the presence of water than molecular oxygen in a dry temperature, the presence of this active form of oxygen results in marked oxidation of a metal, for instance, iron. For this reason the selective use of a frequency which will remove either the water or the oxygen will be effective to a very considerable extent even though the other is not removed. Thus, when either or both are removed, a surface is prepared for coating in a highly effective manner; and the coated surface is more resistant to corrosion.

In treating a metal electrostatically, either for removing adherent moisture, gases, or other material, or for other purpose, or in treating a substance thereon, the piece of metal itself may be used as one electrode if desired.

The invention has a wide application in the bonding of powders in situ without the presence of any considerable degree of heat, and is particularly desirable for use when there is present material which is destroyed or degraded in the presence of undue heat. In this aspect the present invention provides an advantageous method of molding powders and fibres, etc., by surface softening and bonding without softening the interior of particles, fibers, etc. For such purposes, and likewise for the bonding of powders in powder metallurgy as discussed hereafter, eddy currents may be utilized in some instances instead of or in addition to an electrostatic field, and, where the material to be softened, reacted, or otherwise affected has magnetic properties, hysteresis effects may be employed. Likewise ultra sonic can be utilized to activate selectively particular molecules.

The invention finds an effective use in the bonding of powdered metal, both directly (metal-to-metal) and by means of a resinous material, for example polyamides or cellulose acetate. By assembling the metal and plastic in powdered form, with the resinous material dispersed throughout the mix, and pressing between electrode platens subjected to a vibratory influence within the anomalous dispersion range of the cellulose acetate, an effective bonding is secured. By using at the same time or immediately prior a purging frequency to clean the surfaces of the metal particles, as described above, the bonding is greatly improved not only plastic to metal but even metal to metal. In instances where the powdered material comprises subdivided fibrous or crystalline or other material having a definite molecular orientation, as for example comminuted rayon fibers, there may be effectively employed a frequency or band of frequencies which will selectively activate outermost molecules but not the oriented molecules in the different central environment whereby to soften the surfaces of the fiber particles without softening the cores or destroying the molecular orientation thereof. A plasticizing agent may be used if desired, and here again a frequency in the anomalous dispersion range of the plasticizer may be used as set forth in my copending application Serial No. 501,707 to selectively activate the plasticizer molecules instead of or in addition to the frequency selected to activate one or more of the powders present.

The conditioning of materials for bonding, as by the removal of water or adsorbed gases therefrom, or even the loosening of corrosion products, through the selective use of vibratory influences, in itself greatly facilitates bonding procedures involving powder metallurgy, for many of the difficulties encountered in powder metallurgy have to do with the conditioning of the surface of the metal.

Where two or more effects involving the selective activation of a plurality of substances as, for example, the removal of a foreign substance from a surface to be coated and the softening of a coating material, the removal of a vehicle and the polymerization or condensation of a coating material, or effects involving any two or more substances, having well-spaced anomalous dispersion ranges, are to be achieved simultaneously, it is often desirable to apply a complex frequency consisting of a plurality of frequencies each one of which is within the anomalous dispersion range of one of the substances. It is however possible, in instances where no materials present will be adversely affected by intervening frequencies, to employ a range of frequencies which not only includes a frequency within each of two or more anomalous dispersion ranges but also one or more intermediate, or even exterior, frequencies which are either harmless or will be effective at some other stage in the treatment. An example of the latter is where the treatment itself will shift the anomalous dispersion range of a treated substance, in which case a band of frequencies may be applied throughout the treatment, including a frequency in the initial range of anomalous dispersion as well as other frequencies which come within the anomalous dispersion range by its shift during the treatment. More advantageously the frequency is shifted during the treatment to follow approximately the shift of the anomalous dispersion range.

I claim:

1. A coating procedure comprising subjecting a surface to be coated to a vibratory influence of frequency within an anomalous dispersion range of a diffusible foreign substance substantially at said surface, applying a coating to said surface before objectionable substance driven off by said vibratory influence is readsorbed and subjecting the coated surface to a vibratory influence of frequency within an anomalous dispersion range of a substance at said coated surface.

2. A coating procedure comprising applying a coating to a surface to be coated and subjecting the coated surface to a vibratory influence of frequency within an anomalous dispersion range of an ingredient of the coating and to a vibratory influence of frequency within an anomalous dispersion range of a diffusible foreign substance on the surface on which said coating is carried.

3. A coating procedure comprising the steps of subjecting a material to be coated to vibratory influence of frequencies within the anomalous dispersion ranges respectively of different diffusible substances adherent thereon, applying a coating to said material before readsorption of such substances by said material and subjecting the coating to vibratory influence of frequency within the anomalous dispersion range of an ingredient thereof.

4. A coating procedure comprising the steps of subjecting a material to be coated to a vibratory influence of frequency within the anomalous dispersion range of a diffusible foreign substance adherent on said surface, for the removal of same, and concurrently applying a coating to said material.

5. In a coating procedure the combination of steps comprising subjecting a surface to be coated to a vibratory influence of frequency within the anomalous dispersion range of a diffusible impurity adsorbed at said surface and at the same time keeping said surface covered by a medium adapted to diffuse the impurity away from said surface and which is itself compatible with said coating, and subjecting said medium simultaneously to a vibratory influence of frequency within the anomalous dispersion range of a part of the medium which is at an appreciable distance away from said surface.

6. In a coating procedure the combination of steps comprising subjecting a surface to be coated to a vibratory influence of frequency within the anomalous dispersion range of a diffusible impurity adsorbed at said surface and at the same time keeping said surface covered by a medium adapted to diffuse the impurity away from said surface and which is itself compatible with said coating, and subjecting said medium simultaneously to vibratory influence of frequencies within the anomalous dispersion range of the diffusible impurity of the medium away from said surface.

7. A coating procedure comprising the steps of covering with a liquid coating material a surface to be coated subjecting said surface to a vibratory influence of frequencies within the anomalous dispersion ranges respectively of the surface being coated, of diffusible impurities adsorbed on said surface and of a part of the coating material which is at an appreciable distance away from said surface.

8. A coating procedure comprising the steps of covering with a hardenable liquid coating a surface to be coated, subjecting said surface to a vibratory influence of frequencies within the anomalous dispersion ranges respectively of the surface being coated, of diffusible impurities adsorbed on said surface and of a part of the coating which is at an appreciable distance away from said surface.

9. A bonding procedure comprising assembling powdered material for bonding, and subjecting to a vibratory influence within the anomalous dispersion range of diffusible impurities adsorbed at the surfaces of the powdered material and pressing the powder particles into adhesion.

10. A bonding procedure comprising assembling powdered material for bonding, and subjecting concurrently to pressure and to a vibratory influence within the anomalous dispersion range of diffusible impurities adsorbed at the surfaces of the powdered material.

11. A bonding procedure comprising assembling powdered plastic material for bonding, and subjecting to a vibratory influence within the anomalous dispersion range of a diffusible material at the surfaces of the powdered material, and pressing the powder particles into adhesion.

12. A bonding procedure comprising assembling powdered metallic material and powdered thermoplastic material for bonding, and subjecting to a vibratory influence within the anomalous dispersion range of diffusible impurities adsorbed at the surfaces of the powdered materal, and pressing the powder particles into adhesion.

13. A bonding procedure comprising subjecting powdered material while in an inert medium which is not adsorbed by said material to a vibratory influence of frequency within the anomalous dispersion range of a diffusible foreign substance carried on the surface thereof and to mechanical pressure.

14. A bonding procedure comprising subjecting powdered material while under vacuum to a vibratory influence of frequency within the anomalous dispersion range of a diffusible foreign substance carried on the surface thereof and to mechanical pressure.

ORLAN M. ARNOLD.

REFERENCES CITED

The following references are of record in the file of this patent:

UNITED STATES PATENTS

| Number | Name | Date |
|---|---|---|
| 2,089,966 | Kassner | Aug. 17, 1937 |
| 2,223,476 | Amstuz | Dec. 3, 1940 |
| 2,257,177 | Luster | Sept. 30, 1941 |
| 2,321,131 | Crandell | June 8, 1943 |
| 2,324,068 | Crandell | July 13, 1943 |
| 2,325,652 | Bierwirth | Aug. 3, 1943 |
| 2,347,324 | Johnson | Apr. 25, 1944 |
| 2,364,526 | Hansell | Dec. 5, 1944 |